United States Patent
Jimenez Pino et al.

(10) Patent No.: US 11,368,037 B2
(45) Date of Patent: Jun. 21, 2022

(54) ON-BOARD CHARGER (OBC) SINGLE-STAGE CONVERTER

(71) Applicant: Lear Corporation, Southfield, MI (US)

(72) Inventors: Rafael Jimenez Pino, Valls (ES); Magi Margalef Boquera, Valls (ES); Pablo Gaona Rosanes, Valls (ES); Antonio Leon Masich, Valls (ES); Oscar Lucia Gil, Saragossa (ES); Hector Sarnago Andia, Olvega (ES)

(73) Assignee: LEAR CORPORATION, Southfield, MI (US)

( * ) Notice: Subject to any disclaimer, the term of this patent is extended or adjusted under 35 U.S.C. 154(b) by 373 days.

(21) Appl. No.: 16/682,398

(22) Filed: Nov. 13, 2019

(65) Prior Publication Data
US 2021/0143665 A1 May 13, 2021

(51) Int. Cl.
| | |
|---|---|
| H02J 7/04 | (2006.01) |
| H02J 7/16 | (2006.01) |
| H02J 7/02 | (2016.01) |
| H02M 1/15 | (2006.01) |
| H02M 7/06 | (2006.01) |

(52) U.S. Cl.
CPC .............. *H02J 7/022* (2013.01); *H02M 1/15* (2013.01); *H02M 7/06* (2013.01)

(58) Field of Classification Search
USPC .......................... 320/137, 138, 139, 140, 145
See application file for complete search history.

(56) References Cited

U.S. PATENT DOCUMENTS

| | | | |
|---|---|---|---|
| 8,466,652 B2 | 6/2013 | Klaes | |
| 8,587,975 B2 | 11/2013 | Jain et al. | |
| 8,649,189 B2 | 2/2014 | Tang et al. | |
| 9,496,797 B2 | 11/2016 | Panov et al. | |
| 9,887,616 B2 | 2/2018 | Bai et al. | |
| 2016/0016479 A1 | 1/2016 | Khaligh et al. | |
| 2016/0172877 A1* | 6/2016 | Xue | H02M 7/797 320/145 |
| 2017/0005565 A1* | 1/2017 | Bai | H02M 1/15 |
| 2017/0093157 A1 | 3/2017 | Pierquet et al. | |
| 2017/0229972 A1 | 8/2017 | Cerqueira Pinto Bezerra Varajaeo | |
| 2017/0244317 A1* | 8/2017 | Kondo | H02M 1/14 |
| 2018/0152095 A1 | 5/2018 | Bai et al. | |
| 2020/0324665 A1* | 10/2020 | Mackenzie | H02J 7/042 |
| 2021/0135581 A1 | 5/2021 | Rajashekara et al. | |

FOREIGN PATENT DOCUMENTS

| | | | | | |
|---|---|---|---|---|---|
| CN | 108352788 A | * | 7/2018 | ............ | H02M 7/219 |
| CN | 110380625 A | * | 10/2019 | | |
| JP | 3674283 B2 | * | 7/2005 | | |
| JP | 2012222951 A | * | 11/2012 | | |
| JP | 6569839 B1 | * | 9/2019 | .............. | H02M 7/12 |

* cited by examiner

*Primary Examiner* — Brian Ngo
(74) *Attorney, Agent, or Firm* — Brooks Kushman P.C.

(57) ABSTRACT

An on-board charger for charging a battery, such as a traction battery of an electric vehicle, includes an AC/DC converter and a pulsating buffer (PB) converter. The AC/DC converter is configured to convert an AC input from a mains supply into an output having a DC voltage and a current ripple. The PB converter is connected to the AC/DC converter and is configured to process the output of the AC/DC converter to reduce or minimize the current ripple thereof and transform the output of the AC/DC converter into a battery-level DC output for charging the battery.

12 Claims, 8 Drawing Sheets

ON-BOARD CHARGER (OBC) SINGLE-STAGE CONVERTER

TECHNICAL FIELD

The present invention relates to electrical architectures and corresponding control strategies of on-board chargers.

BACKGROUND

An on-board charger (OBC) of an electric vehicle is used for charging a traction battery of the vehicle. The OBC converts electrical power absorbed from an AC power source into DC electrical power and charges the battery with the DC electrical power.

SUMMARY

An on-board charger (OBC) for charging a battery, such as a traction battery of an electric vehicle, is provided. The OBC includes an AC/DC converter and a pulsating buffer (PB) converter. The AC/DC converter is configured to convert an AC input from a mains supply into an output having a DC voltage and a current ripple. The PB converter is connected to the AC/DC converter and is configured to process the output of the AC/DC converter to reduce or minimize the current ripple thereof and transform the output of the AC/DC converter into a battery-level DC output for charging the battery.

In embodiments, the AC/DC converter includes a rectifier and a converter portion. The rectifier is configured to rectify the AC input from the mains supply into a rectified AC input and the converter portion is configured to convert the rectified AC input into the output of the AC/DC converter. In embodiments, the converter portion includes a primary-side power switch bridge on a primary-side of a transformer and a secondary-side power switch bridge on a secondary-side of the transformer. The primary-side power switch bridge has first and second pairs of power switches and the secondary-side power switch bridge has first and second pairs of power switches.

In embodiments, the rectifier may be a full-bridge diode rectifier or a full-bridge active rectifier, such as a MOSFET rectifier.

In embodiments, the OBC further includes at least an additional AC/DC converter. Each additional AC/DC converter is configured to convert the AC input from the mains supply into an additional output having a DC voltage and a current ripple. The PB converter is connected individually to each additional AC/DC converter and is configured to process the output of each additional AC/DC converter to reduce or minimize the current ripple thereof and transform the output of each additional AC/DC converter into the battery-level DC output for charging the battery.

In embodiments, the PB converter includes an energy storage capacitor and an inductor and a pair of power switches.

In embodiments, the AC/DC converter lacks a power factor corrector (PFC) and the AC/DC converter and the PB converter lack a DC link capacitor therebetween.

Another OBC for charging a battery, such as a traction battery of an electric vehicle, is provided. This OBC includes an electronics assembly including an AC/DC converter and a pulsating buffer (PB) converter connected to the AC/DC converter. This OBC further includes a controller configured to control the AC/DC converter to convert an AC input from a mains supply into an output having a DC voltage and a current ripple and to control the PB converter to process the output of the AC/DC converter to reduce or minimize the current ripple thereof and transform the output of the AC/DC converter into a battery-level DC output for charging the battery.

In embodiments, the AC/DC converter includes a rectifier configured to rectify the AC input from the mains supply into a rectified AC input, and the AC/DC converter further includes a dual-active power switch bridge assembly having a primary-side power switch bridge on a primary-side of a transformer and a secondary-side power bridge on a secondary-side of the transformer. The primary-side power switch bridge has two pairs of primary-side power switches and the secondary-side power switch bridge has two pairs of secondary-side power switches. The controller is further configured to alternately turn on-and-off the power switches of the primary-side and secondary-side power switch bridges in accordance with an AC/DC converter control strategy to cause the AC/DC converter to convert the rectified AC input into the output of the AC/DC converter.

The controller may include a micro-controller and a comparator assembly. The micro-controller is configured to generate a positive reference signal and a negative reference signal based on a difference between the rectified AC input and a desired rectified AC input. The comparator assembly is configured to compare an output current generated by the primary-side power switch bridge from the rectified AC input with the positive reference signal, turn-on a first pair of the primary-side power switches and a first pair of the secondary-side power switches and turn-off a second pair of the primary-side power switches and a second pair of the secondary-side power switches upon the output current equaling the positive reference signal, and turn-off the first pair of the primary-side power switches and the first pair of the secondary-side power switches and turn-on the second pair of the primary-side power switches and the second pair of the secondary-side power switches upon the output current equaling the negative reference signal to thereby cause the AC/DC converter to generate the output of the AC/DC converter.

In embodiments, the comparator assembly includes a first comparator which receives the positive reference signal and a sensed value of the output current and switches its output upon the output current equaling the positive reference signal; and the comparator assembly further includes a second comparator which receives the negative reference signal and the sensed value of the output current and switches its output upon the output current equaling the negative reference signal.

In embodiments, the comparator assembly further includes a digital two-state change circuit, such as a digital flip-flop circuit, and a digital driver circuit which function with the outputs of the first and second comparators to maintain on the first pair of the primary-side power switches and the first pair of the secondary-side power switches and maintain off the second pair of the primary-side power switches and the second pair of the secondary-side power switches until the output current equals the negative reference signal and to maintain off the first pair of the primary-side power switches and the first pair of the secondary-side power switches and maintain on the second pair of the primary-side power switches and the second pair of the secondary-side power switches until the output current equals the positive reference signal to thereby cause the AC/DC converter to generate the output of the AC/DC converter.

In embodiments, the PB converter includes an energy storage capacitor and an inductor and a pair of power switches. The controller is further configured to alternately turn on-and-off the power switches of the PB converter in accordance with a PB converter control strategy to cause the PB converter to process the output of the AC/DC converter to reduce or minimize the current ripple thereof and transform the output of the AC/DC converter into the battery-level DC output for charging the battery.

In embodiments, the controller includes a micro-controller and a comparator assembly. The micro-controller is configured to generate a positive reference signal and a negative reference signal based on a difference between (i) an output current of the PB converter and (ii) a target output current. The comparator assembly is configured to compare a buffer current absorbed by the PB converter from the DC output with the ripple with the positive reference signal, turn-on a first one the power switches of the PB converter and turn-off a second one of the power switches of the PB converter upon the PB converter buffer current equaling the positive reference signal, and turn-off the first one of the power switches of the PB converter and turn-on the second one of the power switches of the PB converter upon the PB converter buffer current equaling the negative reference signal to thereby cause the PB converter to process the output of the AC/DC converter to reduce or minimize the current ripple thereof and transform the output of the AC/DC converter into the battery-level DC output for charging the battery.

In embodiments, the comparator assembly includes a first comparator which receives the positive reference signal and a sensed value of the PB converter buffer current and switches its output upon the PB converter buffer current equaling the positive reference signal; and the comparator assembly further includes a second comparator which receives the negative reference signal and the sensed value of the PB converter buffer current and switches its output upon the PB converter buffer current equaling the negative reference signal.

In embodiments, the comparator assembly further includes a digital two-state change circuit and a digital driver circuit which function with the outputs of the first and second comparators to maintain on the first power switch of the PB converter and maintain off the second power switch of the PB converter until the PB converter buffer current equals the negative reference signal and to maintain off the first power switch of the PB converter and maintain on the second power switch of the PB converter until the PB converter buffer current equals the positive reference signal to thereby cause the PB converter to process the output of the AC/DC converter to reduce or minimize the current ripple thereof and transform the output of the AC/DC converter into the battery-level DC output for charging the battery.

In embodiments, this OBC further includes an additional AC/DC converter connected to the PB converter. The controller is further configured to control the additional AC/DC converter to convert the AC input from the mains supply into an output having a DC voltage and a current ripple and to control the PB converter to process the output of the additional AC/DC converter to reduce or minimize the current ripple thereof and transform the output of the additional AC/DC converter into the battery-level DC output for charging the battery.

DETAILED DESCRIPTION

Detailed embodiments of the present invention are disclosed herein; however, it is to be understood that the disclosed embodiments are merely exemplary of the invention that may be embodied in various and alternative forms.

The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
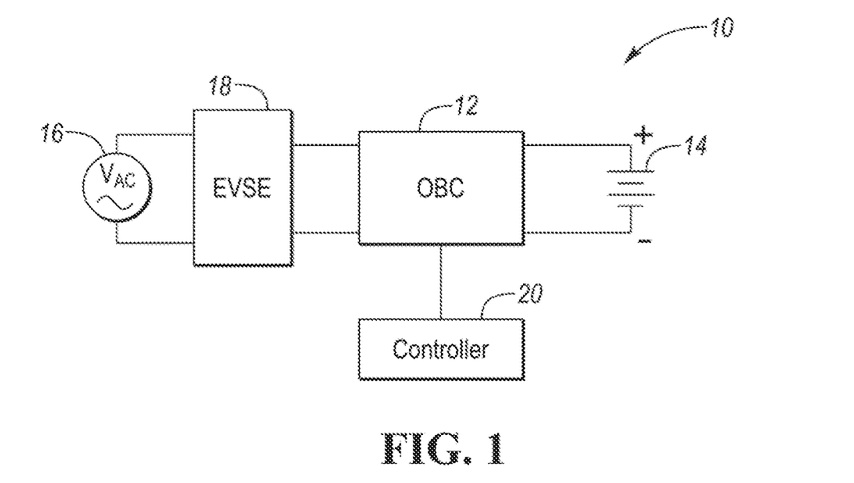
FIG. 1 illustrates a block diagram of an electrical system having an on-board charger (OBC)

Referring now to FIG. 1, a block diagram of an electrical system 10 having an on-board charger (OBC) 12 is shown. OBC 12 is "on-board" an electric vehicle. The term "electric vehicle" herein encompasses any type of vehicle which uses electrical power for vehicle propulsion and encompasses battery-only electric vehicles (BEV), hybrid electric vehicles (HEV), plug-in hybrid electric vehicles (PHEV), and the like. OBC 12 is used for charging a traction battery 14 of the electric vehicle. Traction battery 14 is a high voltage (HV) DC traction battery per electrical energy requirements for electric vehicle propulsion.

Electrical system 10 further includes an AC power source such as a mains supply 16 of the electrical grid. OBC 12 charges traction battery 14 using electrical power from mains supply 16. OBC 12 has an input which connects to mains supply 16 by an external Electric Vehicle Supply Equipment (EVSE) 18 to absorb electrical power from the mains supply. OBC 12 has an output which connects to traction battery 14. OBC 12 converts electrical power absorbed from mains supply 16 into DC electrical power and charges traction battery 14 with the DC electrical power.

A controller 20 is associated with OBC 12. Controller 20 is an electronic device such as a processor, micro-controller, or the like (e.g., a computer) on-board the electric vehicle (e.g., controller 20 is a vehicle controller). Controller 20 is in communication with OBC 12 to control operations of the OBC. Controller 20 controls OBC 12 in converting electrical power from mains supply 16 into DC electrical power and charging traction battery 14 with the DC electrical power. For example, controller 20 appropriately controls switching and switching duration of power switches of OBC 12 used for converting electrical power from mains supply 16 into a selected amount of DC electrical power. Controller 20 is operable to communicate and control other nodes of electrical system 10 and the electric vehicle including nodes involved in the charging applications.

Ordinary OBCs have a dual stage architecture including a power factor corrector (PFC) and a DC/DC converter. The PFC and the DC/DC converter are connected through a capacitive energy buffer, referred to as a "DC link capacitor". The PFC is connectable to the mains supply and the DC/DC converter is connected to the traction battery. The PFC handles AC/DC conversion and is controlled by a controller to ensure a high-power factor at the input. The DC/DC converter is controlled by the controller to convert a high-voltage stabilized input at the DC link capacitor into a DC battery level for the traction battery. In this regard, the DC/DC converter adapts the output voltage/current to the requirements of the traction battery. In sum, the PFC functions as the grid front end and the DC/DC converter adapts the output to the range of the traction battery.

The PFC includes one or more bulky and costly inductors. The energy conversion scheme of ordinary OBCs inherently requires an energy storage element to store/provide the difference between the instantaneous input power, which is sinusoidal to comply with EMC standards, and the output power, which is expected to be constant. Presently, due to high-power requirements, the energy storage element of choice is a configuration of electrolytic capacitors (i.e., the DC-link capacitor). The high capacity required leads to bulky capacitors (i.e., the DC link capacitor) which reduce power density (for example, around 30% volume) and have significant implications on the maximum operating temperature and estimated lifetime (MTBF).

Further, a PFC and a DC/DC converter are present for each rail of the OBC. Thus, a 3-phase, ordinary OBC includes three sets of PFCs and DC/DC converters. As described above, each set includes several energy storage elements. Namely, each rail includes one or more inductors at the PFC stage and electrolytic capacitors at the DC/DC converter stage, which lead to relatively poor power density and relatively poor MTBF and increased cost.

Figure 2:
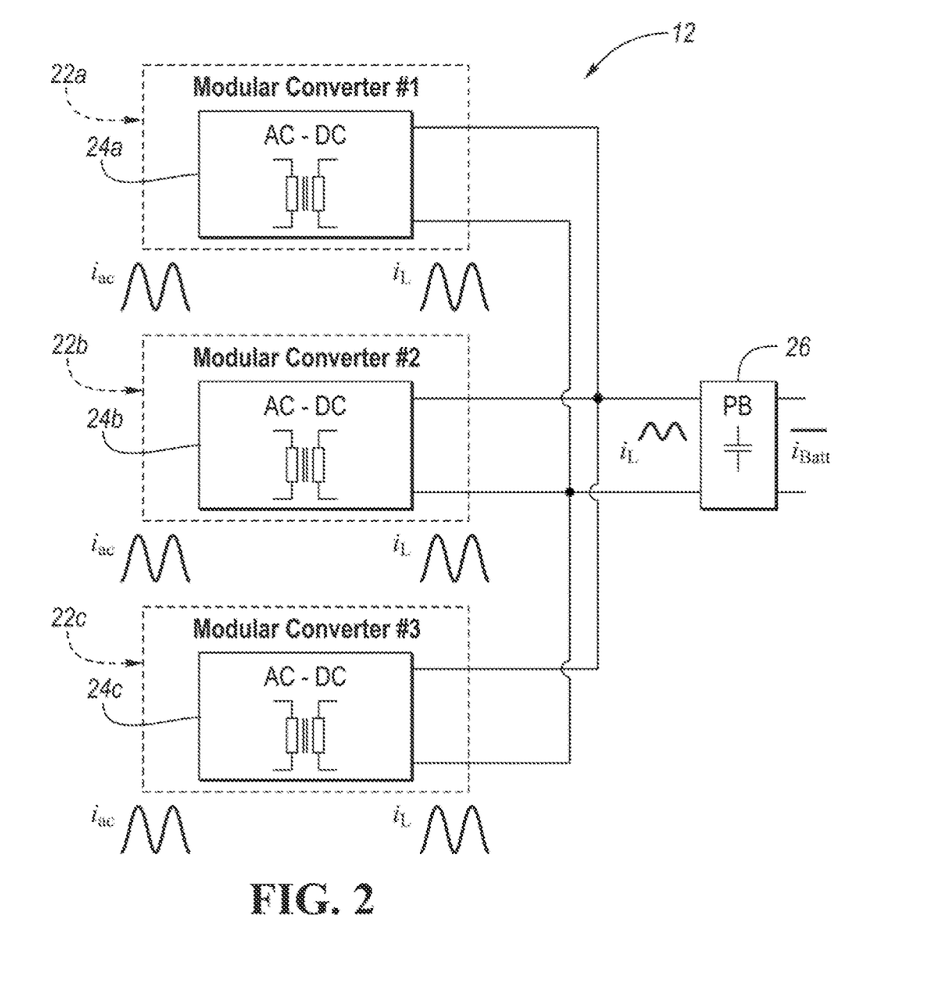
FIG. 2 illustrates a block diagram of the OBC in which the OBC is a 3-phase OBC.

Referring now to FIG. 2, with continual reference to FIG. 1, a block diagram of OBC 12 is shown. OBC 12 is a n-phase OBC, where n is an integer of at least one. For example, as shown in FIG. 2, OBC 12 is a 3-phase OBC having first, second, and third rails 22a, 22b, and 22c.

Rails 22a, 22b, 22c have the same type of electrical circuitry in the form of a "modular converter" including an AC/DC converter 24a, 24b, 24c, respectively. Each AC/DC converter 24a, 24b, 24c is a single stage topology. Thus, unlike ordinary OBCs having a dual stage architecture including a PFC, a DC link capacitor, and a DC/DC converter for each rail, OBC 12 has a single stage architecture including an AC/DC converter for each rail.

OBC 12 further includes a pulsating buffer (PB) converter 26. PB converter 26 is shared by AC/DC converters 24a, 24b, 24c. Particularly, AC/DC converters 24a, 24b, 24c are individually cascading-connected to PB converter 26 as shown in FIG. 2. AC/DC converters 24a, 24b, 24c are connectable at their input ends to mains supply 16 and are connected at their output ends to the input end of PB 26. The output end of PB converter 26 is connected to traction battery 14. AC/DC converters 24a, 24b, 24c together with PB converter 26 function to convert electrical power from mains supply 16 into DC electrical power for charging traction battery 14. More particularly, controller 20 controls the operation of AC/DC converters 24a, 24b, 24c and the operation of PB converter 26 according to control strategies for OBC 12 to convert electrical power from mains supply 16 into DC electrical power for charging traction battery 14.

AC/DC converters 24a, 24b, 24c include the same type of electrical circuitry and function the same. Thus, only AC/DC converter 24a will be described in greater detail. In general, AC/DC converter 24a has a converter topology which neglects the use of a classical PFC and its associated inductor. AC/DC converter 24a is combined with the use of pulsating buffer (PB) converter 26 which maximizes the use of an energy storage capacitor, in parallel with traction battery 14, significantly reducing the rail capacitor size requirements.

In operation, AC/DC converter 24a directly converts input AC from mains supply 16 into a DC voltage and a positive oscillating current (i.e., "current ripple). The input AC from mains supply 16 is sinusoidal as understood. The output of AC/DC converter 24a is a DC voltage and a current ripple. PB converter 26 post-processes the DC voltage and current ripple output of AC/DC converter 24a to preferably eliminate or substantially eliminate (or minimize or at least reduce) the current ripple and transform the output of AC/DC converter 24a into a battery level DC output.

Figure 3:
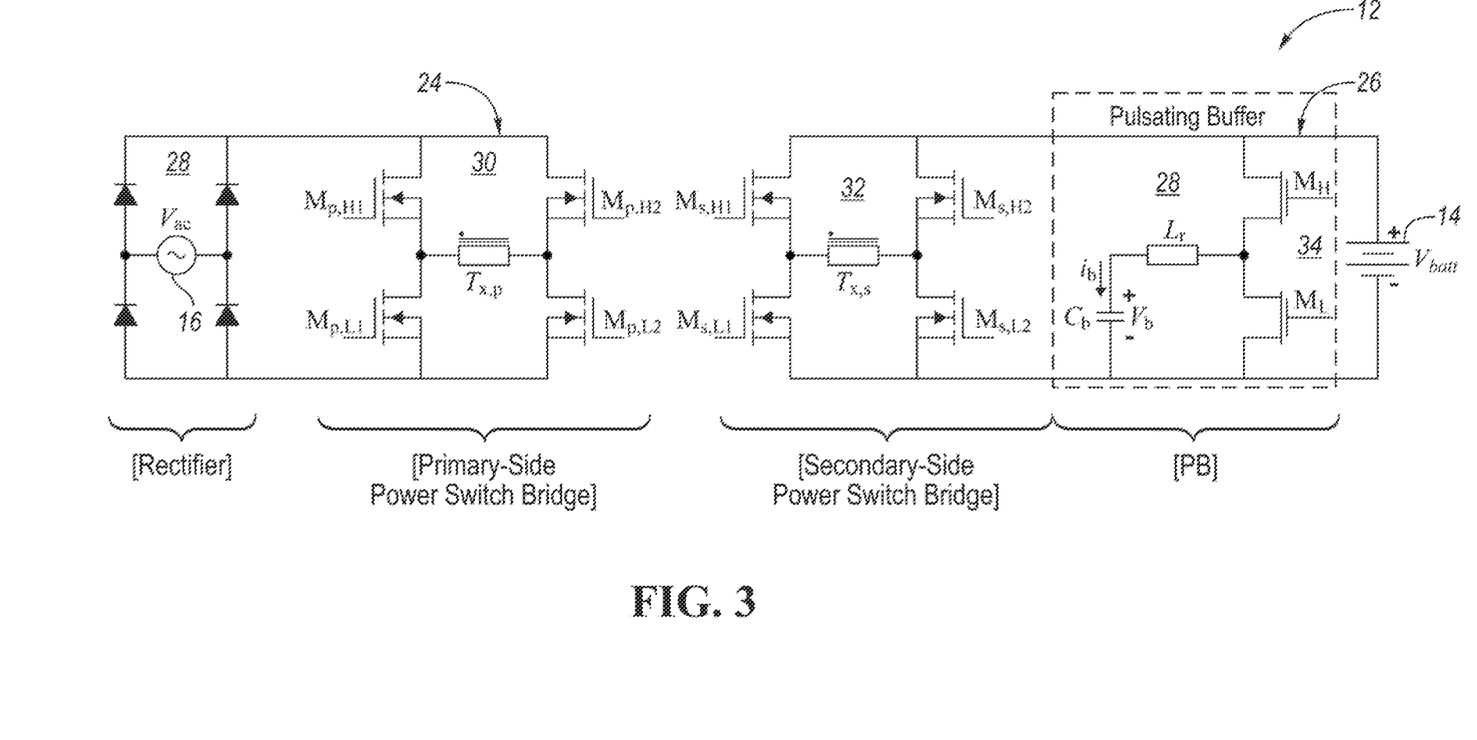
FIG. 3 illustrates an electrical schematic diagram of the OBC in which the OBC is a single-phase OBC in accordance with an embodiment.

Referring now to FIG. 3, with continual reference to FIGS. 1 and 2, an electrical schematic diagram of OBC 12 in which the OBC is a single-phase OBC is shown. The depiction of OBC 12 in FIG. 3 represents a single-phase direct OBC implementation (unidirectional). As shown in FIG. 3, OBC 12 includes an AC/DC converter 24 and pulsating buffer (PB) converter 26. AC/DC converter 24 is connected to mains supply 16. PB converter 26 is connected to traction battery 14.

As further shown in FIG. 3, AC/DC converter 24 includes a group of four diodes which form a full-diode bridge rectifier 28 at the front end of the AC/DC converter. Rectifier 28 is connected to mains supply 16 to rectify the AC input for AC/DC converter 24. AC/DC convertor 24 further includes a first group of four power switches which form a primary-side power switch bridge 30 on a primary-side of a transformer Tx. AC/DC converter 24 further includes a second group of four power switches which form a secondary-side power switch bridge 32 on a secondary-side of the transformer Tx. In a refinement, multiple secondary-side power switch bridges 32 may be provided on the secondary-side of the transformer Tx (each preferably with a separate secondary coil of Tx). The secondary-side power switch bridges 32, each comprising a group of four power switches, can be connected in series. In that way, lower-voltage or otherwise lower-specification (and presumably less expensive) components may be used for the power switch bridges 32 to provide an equivalent output voltage from OBC 12. (Such a connection of multiple power switch bridges may also be used on each leg of a three-phase version of OBC 12 to be described hereinafter.)

AC/DC converter 24 with primary-side and secondary-side power switch bridges 30, 32 on respective sides of the transformer Tx has a structure based on dual-active bridge (DAB) topology. Controller 20 controls power switch bridges 30, 32 to convert the rectified voltage inputted from rectifier 28 into the DC voltage and current ripple output. The DC voltage and current ripple output is outputted from AC/DC converter 24 to PB converter 26.

As further shown in FIG. 3, PB converter 26 includes a pair 34 of power switches, an inductor Lr, and an energy storage capacitor Cb. PB converter 26 thus has a current ripple processing based on pulsating buffer topology. PB converter 26 receives the current ripple outputted from AC/DC converter 24. Controller 20 controls pair of power switches 34 to eliminate the current ripple and transform the output of AC/DC converter 24 into a battery level DC output for charging traction battery 14.

As shown in FIG. 3, the power switches of primary-side and secondary-side power switch bridges 30, 32 of AC/DC converter 24 and the power switches of power switch pair 34 of PB converter 26 are MOSFETs.

Compared with an ordinary OBC as described above, OBC 12 does not have a classical PFC converter thereby avoiding the need of bulky and expensive inductor coils. In OBC 12, only a single magnetic component, i.e., the transformer Tx, is in the rectifier and DC/DC block of AC/DC converter 24. PB converter 26 replaces the DC link capacitor compensation function of an ordinary OBC. PB converter 26 compensates the current ripple outputted from AC/DC converter 24 to the PB converter to provide a smooth DC output voltage and thereby significantly reduces the size of energy storage capacitor Cb of the PB converter.

Figure 4:
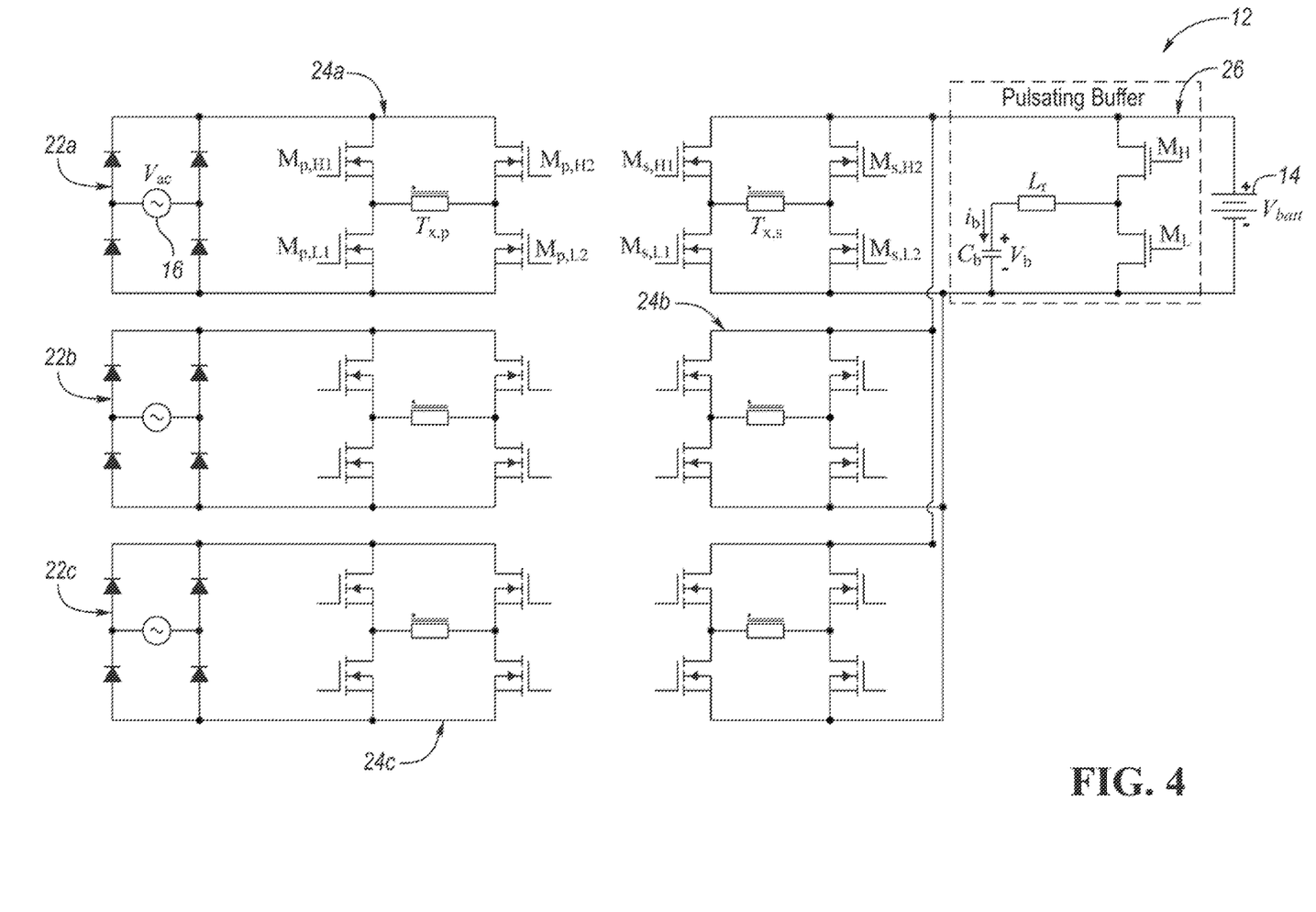
FIG. 4 illustrates an electrical schematic diagram of the OBC in which the OBC is a 3-phase OBC in accordance with another embodiment.

Referring now to FIG. 4, with continual reference to FIGS. 1, 2, and 3, an electrical schematic diagram of OBC 12 in which the OBC is a 3-phase OBC in accordance with an embodiment is shown. The depiction of OBC 12 in FIG. 4 represents a 3-phase direct OBC implementation (unidirectional). As shown in FIG. 4, OBC 12 includes three rails 22a, 22b, 22c having AC/DC converters 24a, 24b, 24c, respectively. AC/DC converters 24a, 24b, 24c are connected in parallel to one another between mains supply 16 and PB converter 26. In this regard, the input ends of AC/DC converter 24a, 24b, 24c are connected to mains supply 16 and the output end of PB converter 26 is connected to traction battery 14.

Each rail 22a, 22b, 22c absorbs and converts electrical power from mains supply 16 into DC electrical power for charging traction battery 14. Each rail 22a, 22b, 22c, for instance, can deliver 3.6 kW of electrical power for charging traction battery 14. As such, in this instance, 3-phase OBC 12 shown in FIG. 4 can deliver 10.8 kW (3*3.6 kW) of electrical power for charging traction battery 14.

As described and as illustrated, OBC 12 has a modular implementation which enables both single-phase OBC implementation as shown in FIG. 3 and multi-phase OBC implementation such as 3-phase OBC implementation as shown in FIG. 4. In addition to the previously mentioned benefits of the single-phase OBC implementation, the multi-phase OBC implementation has the benefits of sharing a single PB converter 26 thereby further enabling cost reduction. Further, due to the multi-phase OBC implementation, the ripple at the output of AC/DC converter 24a, 24b, 24c is reduced thereby enabling the use of smaller inductor Lr and energy storage capacitor Cb components of PB converter 26 (typically, for the 3-phase OBC implementation, 3:1 size vs. power reduction).

Figure 5:
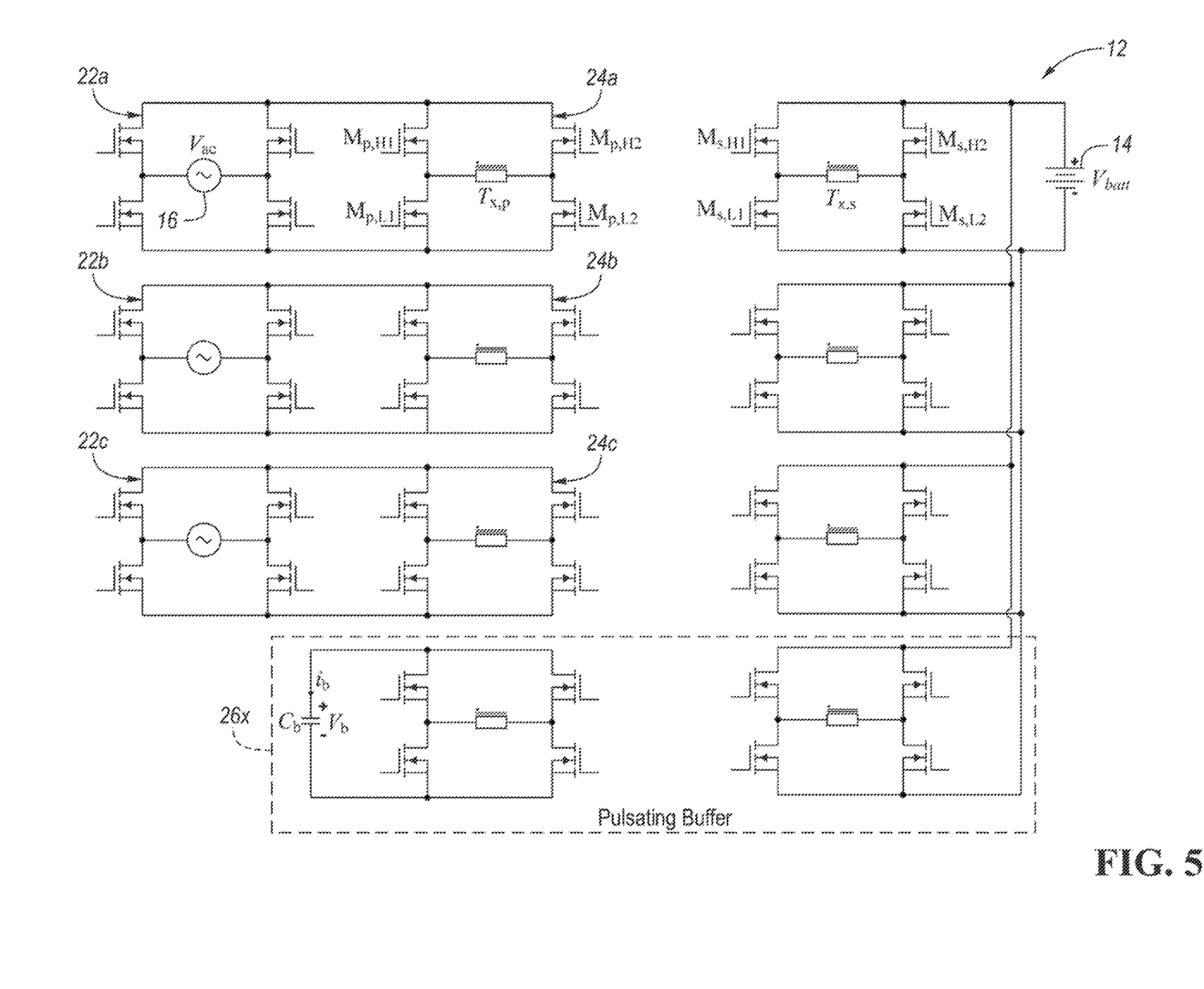
FIG. 5 illustrates an electrical schematic diagram of the OBC in which the OBC is a 3-phase OBC in accordance with another embodiment.

As indicated, OBC 12 shown in each of FIG. 3 and FIG. 4 is unidirectional in that power flow is from mains supply 16 to AC/DC converter 24 to PB converter 26 to traction battery 14. However, OBC 12 can be bidirectional. For instance, OBC 12 shown in each of FIG. 3 and FIG. 4 can be made bidirectional by replacing the diodes of rectifier 28 of AC/DC converter 24 with active switches, such as MOSFET switches (as shown in FIG. 5), to thereby make the rectifier be bidirectional. Consequently, the topology of OBC 12 can be implemented using a synchronous rectifier (bidirectional) enabling a bidirectional power flow: grid-to-vehicle (G2V) and vehicle-to-grid (V2G).

Referring now to FIG. 5, with continual reference to FIGS. 1, 2, 3, and 4, an electrical schematic diagram of OBC 12 in which the OBC is a 3-phase OBC in accordance with another embodiment is shown. The depiction of OBC 12 in FIG. 5 represents a 3-phase, direct OBC implementation (bidirectional). As shown in FIG. 5, OBC 12 includes three rails 22a, 22b, 22c having AC/DC converters 24a, 24b, 24c, respectively. OBC 12 further includes a PB converter 26x. PB converter 26x is connected in cascade with AC/DC converters 24a, 24b, 24c. AC/DC converters 24a, 24b, 24c are connected in parallel to one another with their input ends being connected to mains supply 16 and their output ends together with PB converter 26x being connected to traction battery 14. In operation, all three AC/DC converters 24a, 24b, 24c provide energy to PB converter 26x which compensates the energy (i.e., compensates the energy outputs of the AC/D converters) to provide the DC electrical power (i.e., constant-voltage, constant-current output) for charging traction battery 14.

In addition to the previously mentioned benefits, this 3-phase OBC with cascade PB converter implementation shown in FIG. 5 has the benefits of sharing a single optimized PB converter 26x thereby increasing power density of the complete OBC (some cost penalty added due to additional semiconductors in PB converter 26x). Further benefits include maximizing the use of energy storage capacitor Cb of PB converter 26x independently of the voltage of traction battery 14 to thereby achieve higher performance. The idea here is that energy storage capacitor Cb of PB converter 26x may have a maximum working voltage higher than the required output voltage. Then, with this topology shown in FIG. 5, energy storage capacitor Cb may work at a higher voltage requiring less current (that is in direct relation with losses in this stage).

Figure 6:
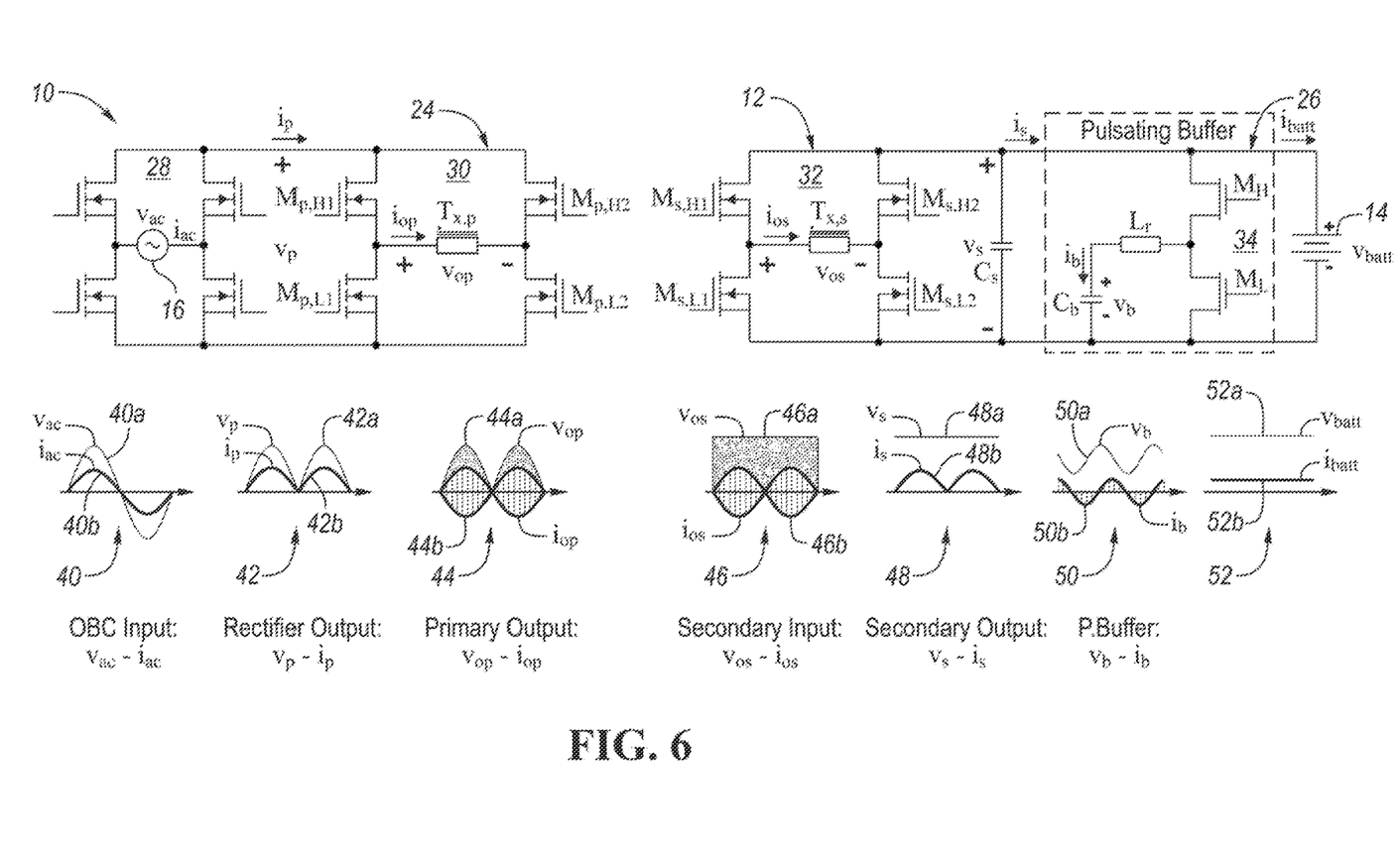
FIG. 6 illustrates an electrical schematic diagram of a rail of the OBC with voltage/current waveform diagrams respectively associated with a mains supply of the electrical system, primary-side and secondary-side power switch bridges of an AC/DC converter of the OBC, a pulsating buffer (PB) converter of the OBC, and a traction battery of the electrical system.

Referring now to FIG. 6, with continual reference to FIGS. 1, 2, 3, and 4, an electrical schematic diagram of a rail of OBC 12 with voltage/current waveform diagrams respectively associated with mains supply 16, primary-side and secondary-side power switch bridges 30, 32 of AC/DC converter 24, PB converter 26, and traction battery 14 is shown.

In operation, mains supply 16 inputs a voltage/current to OBC 12. Voltage/current waveform diagram 40 represents the voltage/current inputted from mains supply 16 to OBC 12. The inputted voltage/current includes an inputted voltage ($v_{ac}$) having a sinusoidal voltage waveform 40a and an inputted current ($i_{ac}$) having a corresponding sinusoidal current waveform 40b.

Rectifier 28 of AC/DC converter 24 receives the inputted voltage/current from mains supply 16 and rectifies the inputted voltage/current into a rectified voltage/current. Voltage/current waveform diagram 42 represents the rectified voltage/current output from rectifier 28. The rectified output voltage/current includes a rectified output voltage ($v_p$) having a rectified, sinusoidal voltage waveform 42a and a rectified output current ($i_p$) having a corresponding rectified, sinusoidal current waveform 42b.

Primary-side power switch bridge 30 of AC/DC converter 24 on the DC/DC primary-side of the transformer Tx receives the rectified output voltage/current from rectifier 28. As will be described in greater detail below, controller 20 controls the operation of primary-side power switch bridge 30 to draw a requisite amount of rectified output current associated with the rectified output voltage from rectifier 28 and generate therefrom a primary-side output voltage/current on the primary-side of the transformer Tx. Voltage/current waveform diagram 44 represents the primary-side output voltage/current. The primary-side output voltage/current includes a primary-side output voltage ($v_{op}$) having a rectified, sinusoidal peak voltage waveform 44a and a primary-side output current ($i_{op}$) having a mirrored, sinusoidal peak current waveform 44b.

As will be further described below, in conjunction with controlling the operation of primary-side power switch bridge 30 to generate the primary-side output voltage/current ($v_{op}$)/($i_{op}$), controller 20 correspondingly controls the operation of secondary-side power switch bridge 32 of AC/DC converter 24 to generate on the secondary-side of the transformer Tx, from the primary-side voltage/current ($v_{op}$)/($i_{op}$), a secondary-side input voltage/current. Voltage/current waveform diagram 46 represents the secondary-side input voltage/current. The secondary-side input voltage/current includes a secondary-side input voltage ($v_{os}$) having a DC peak voltage waveform 46a and a secondary-side input current ($i_{os}$) having a mirrored, sinusoidal peak current waveform 46b.

In the embodiment of OBC 12 shown in FIG. 6, the OBC further includes a capacitor Cs connected in parallel between secondary-side power switch bridge 32 and PB converter 26. The capacitor Cs is charged with the secondary-side input voltage/current ($v_{os}$)/($i_{os}$) to supply therefrom a secondary-side output voltage/current. Voltage/current waveform diagram 48 represents the secondary-side output voltage/current. The secondary-side output voltage/current includes a positive DC source voltage ($v_s$) 48a and a rectified, sinusoidal source current ($i_s$) 48b.

PB converter 26 draws a buffer current associated with a buffer voltage from capacitor Cs. As will be described in greater detail below, controller 20 controls the operation of pair of power switches 34 of PB converter 26 for the PB converter to draw a requisite amount of buffer current associated with the buffer voltage and generate therefrom a targeted, battery voltage/current. The targeted, battery voltage/current is output from PB converter 26 to charge traction battery 14.

Voltage/current waveform diagram 50 represents the buffer current ($i_b$) drawn by PB converter 26 and the associated buffer voltage ($v_b$). The buffer voltage ($v_b$) is a positive DC offset, sinusoidal voltage 50a and the buffer current ($i_b$) has a sinusoidal peak current waveform 50b.

Voltage/current waveform diagram 52 represents the battery voltage/current actually outputted from PB converter 26 to charge traction battery 14. The battery voltage/current outputted from PB converter 26 includes a positive DC voltage ($v_{batt}$) 52a and a positive DC current ($i_{batt}$) 52b.

Figure 7A:
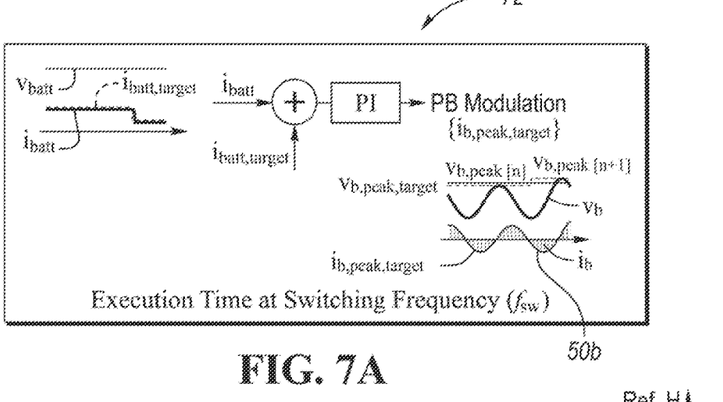
FIG. 7A illustrates details related to how the controller controls the PB converter to draw from the AC/DC converter a requisite amount of buffer current ($i_b$) associated with a buffer voltage ($v_b$) and generate therefrom a targeted, battery voltage/current.
Figure 7B:
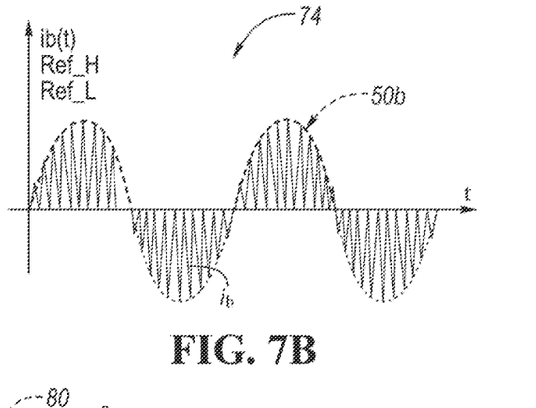
FIG. 7B illustrates an enlarged plot of the buffer current ($i_b$) drawn by the PB converter from the AC/DC converter.
Figure 7C:
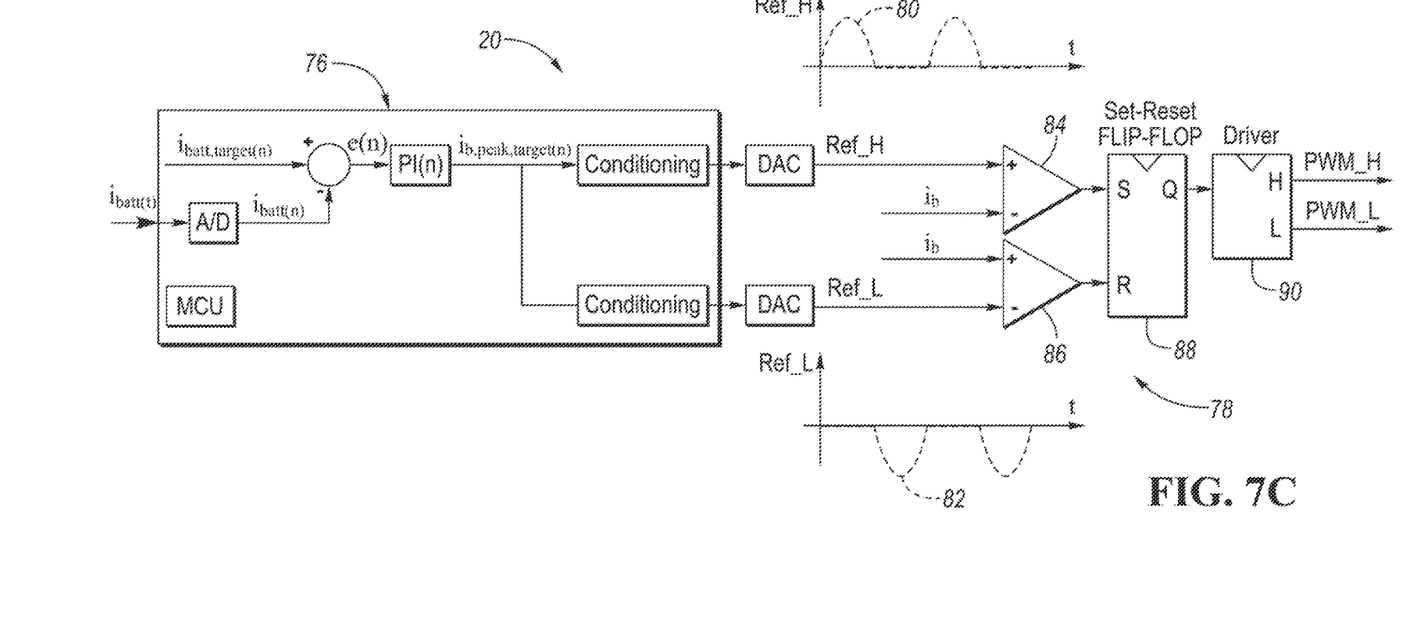
FIG. 7C illustrates a block diagram schematic of the controller which includes a first micro-controller and a first hysteretic comparator assembly which function together to control the PB converter to draw from the AC/DC converter the requisite amount of buffer current ($i_b$) associated with the buffer voltage ($v_b$) and generate therefrom the targeted, battery voltage/current.

Referring now to FIGS. 7A, 7B, and 7C, with continual reference to FIG. 6, control strategy operations carried out by controller 20 for controlling PB converter 26 to draw from AC/DC converter 24 the requisite amount of buffer current ($i_b$) associated with the buffer voltage ($v_b$) and generate therefrom a targeted, battery voltage/current will be described.

FIG. 7A illustrates details 72 related to these control strategy operations. As depicted therein, modulation ("PB modulation") of pair of power switches 34 of PB converter 26 by controller 20 is based on a difference between (i) the battery current ($i_{batt}$) outputted from the PB converter and (ii) the targeted battery current ($i_{batt,target}$) desired to be outputted from the PB converter. Controller 20 controls switches 34 of PB converter 26 according to the PB modulation to cause the PB converter to draw the requisite amount of buffer current ($i_b$) associated with the buffer voltage ($v_b$) and generate therefrom the targeted, battery voltage/current. That is, this PB modulation of power switches 34 of PB converter 26 causes the PB converter to draw the requisite amount of buffer current ($i_b$) having sinusoidal peak current waveform 50b and associated with the buffer voltage ($v_b$) and generate therefrom the targeted, battery voltage/current.

Details 72 shown in FIG. 7A relate to how controller 20 is control PB converter 26 for the PB converter to draw the requisite amount of buffer current ($i_b$). The inputs for this determination are (i) the battery current ($i_{batt}$) outputted from PB converter 26 and (ii) the targeted battery current ($i_{batt,target}$). The battery current ($i_{batt}$) outputted from PB converter 26 is measured using a sensor. The output of this determination is a peak, target buffer current ($i_{b,PEAK,target}$). The peak, target buffer current ($i_{b,PEAK,target}$) defines the PB modulation according to which controller 20 controls power switches 34 of PB converter 26. Particularly, as described below with reference to FIGS. 7B and 7C, the peak, target buffer current ($i_{b,PEAK,target}$) is indicative of the sinusoidal peak current waveform 50b which in turn is indicative of the requisite amount of buffer current ($i_b$). As further described below with reference to FIG. 7C, the peak, target buffer current ($i_{b,PEAK,target}$) is inputted to a high-speed (hardware) conversion stage (i.e., first micro-controller 76 shown in FIG. 7C) of controller 20 for PB converter 26 to be controlled accordingly to draw the requisite amount of buffer current ($i_b$).

FIG. 7B illustrates an enlarged plot 74 of the buffer current ($i_b$) drawn by PB converter 26. As shown in enlarged plot 74, the buffer current ($i_b$) is composed of triangular current waveforms which oscillate at a much higher frequency than the frequency of sinusoidal peak current waveform 50b. The triangular current waveforms are generated due to controller 20 alternately turning on-and-off power switches 34 of PB converter 26 according to the PB modulation for causing the PB converter to draw the requisite amount of buffer current ($i_b$) having sinusoidal peak current waveform 50b and generate the targeted, battery voltage/current.

FIG. 7C illustrates a block diagram schematic of a first micro-controller 76 and a first hysteretic comparator assembly 78 of controller 20. First micro-controller 76 and first comparator assembly 78 function together to control the operation of PB converter 26 for the PB converter to draw from AC/DC converter 24 the requisite amount of buffer current ($i_b$) having sinusoidal peak current waveform 50b and generate therefrom the targeted, battery voltage/current.

In operation, first micro-controller 76 generates a first reference signal ("Ref_H") 80 and a second reference signal ("Ref_L") 82. As can be seen from a comparison of FIGS. 7B and 7C, first reference signal 80 corresponds to positive, half-cycle, sinusoidal peak current waveform components of sinusoidal peak current waveform 50b and second reference signal 82 corresponds to negative, half-cycle, sinusoidal peak current waveform components of sinusoidal peak current waveform 50b. As indicated in FIG. 7C, first micro-controller 76 generates each of first and second reference signals 80, 82 based on respective down-stream conditioning of the peak, target buffer current ($i_{b,PEAK,target}$).

First comparator assembly 78 functions to generate control (i.e., trigger) signals for alternately switching on-and-off power switches 34 of PB converter 26. First comparator assembly 78 generates the control signals based on a comparison of the buffer current ($i_b$) drawn by PB converter 26 with each of first and second reference signals 80 and 82. For instance, with reference to FIGS. 7B and 7C, upon the value of the buffer current ($i_b$) equaling the value of first reference signal 80 (i.e., upon the buffer current ($i_b$) intersecting the positive, half-cycle, sinusoidal peak current waveform component of sinusoidal peak current waveform 50b), first comparator assembly 78 generates control signals to turn off one of power switch pair 34 (e.g., turn off power switch ($M_H$)) and to turn on the other one of power switch pair 34 (e.g., turn on power switch ($M_L$)). Likewise, with further reference to FIGS. 7B and 7C, upon the value of buffer current ($i_b$) equaling the value of second reference signal 82 (i.e., upon the buffer current ($i_b$) intersecting the negative, half-cycle, sinusoidal peak current waveform component of sinusoidal peak current waveform 50b), first comparator assembly 78 generates control signals to turn on the one of power switch pair 34 (i.e., turn on power switch ($M_H$)) and to turn off the other one of power switch pair 34 (i.e., turn off power switch ($M_L$)).

In detail, as shown in FIG. 7C, first comparator assembly 78 includes first and second analog comparator circuits 84 and 86, a digital flip-flop circuit 88, and a digital driver circuit 90. First comparator circuit 84 receives first reference signal ("Ref_H") 80 and a sensed value of buffer current ($i_b$) drawn by PB converter 26 as inputs. Second comparator circuit 86 receives second reference signal ("Ref_L") 82 and the sensed value of buffer current ($i_b$) as inputs. First comparator circuit 84 switches its output upon the value of buffer current ($i_b$) equaling the value of first reference signal 80 (i.e., upon the value of buffer current ($i_b$) being the value of the outer amplitude envelope of which first reference signal 80 consists). Second comparator circuit 86 switches its output upon the value of buffer current ($i_b$) equaling the value of second reference signal 82 (i.e., upon the value of buffer current ($i_b$) being the value of the outer amplitude envelope of which second reference signal 82 consists).

Flip-flop circuit 88 and driver circuit 90 function accordingly for pulse width modulated (PWM) control signals to be provided to power switches 34 of PB converter 26. The PMW control signals provide that a first one of these power switches is turned off and the second one of these power switches is turned on upon buffer current ($i_b$) drawn by PB converter 26 equaling second reference signal 82 and the first power switch stays off and the second power switch stays on until buffer current ($i_b$) equals first reference signal 80. Likewise, the PWM control signals provide that the first power switch is turned on and the second power switch is turned off upon buffer current ($i_b$) equaling first reference signal 80 and the first power switch stays on and the second power switch stays off until buffer current ($i_b$) equals second reference signal 82.

First micro-controller 76 is relatively low cost at it generates a digital external slow loop (i.e., first and second reference signals 80 and 82). First comparator assembly 78 is a low-cost, analog fast-current control loop. In sum, first micro-controller 76 generates reference signals 80 and 82 based on (i) the battery current ($i_{batt}$) outputted from PB converter 26 and (ii) the targeted battery current ($i_{batt,target}$); and first comparator assembly 78 (i.e., hardware) controls the switching of the power switches of PB converter 26 based on a comparison of the buffer current ($i_b$) drawn by PB converter 26 with reference signals 80, 82. In this way, first micro-controller 76 allocates a high-level software control loop that generates waveform inputs to hardware circuitry (i.e., first comparator assembly 78).

Unlike conventional approaches, first micro-controller 76 does not directly measure, perform control action, and/or generate control signals. First micro-controller 76 thereby avoids high resource utilization and timing constraints. That is, first micro-controller 76 does not calculate the vertices at which the buffer current ($i_b$) drawn by PB converter 26 will meet first or second reference signals 80, 82. First micro-controller 76 thereby does not generate control signals for controlling power switches. As the vertices occur relatively rapidly, as can be seen in FIG. 7B, such control signals would require relatively fast processing. Instead of generating such control signals, first micro-controller 76 generates first and second reference signals 80, 82. The generation of reference signals 80, 82 employs processing on the order of milliseconds. Accordingly, first micro-controller 76 functions at a relatively low speed (e.g., milliseconds) instead of operating at a relatively high speed (e.g., nanoseconds).

Figure 8A:
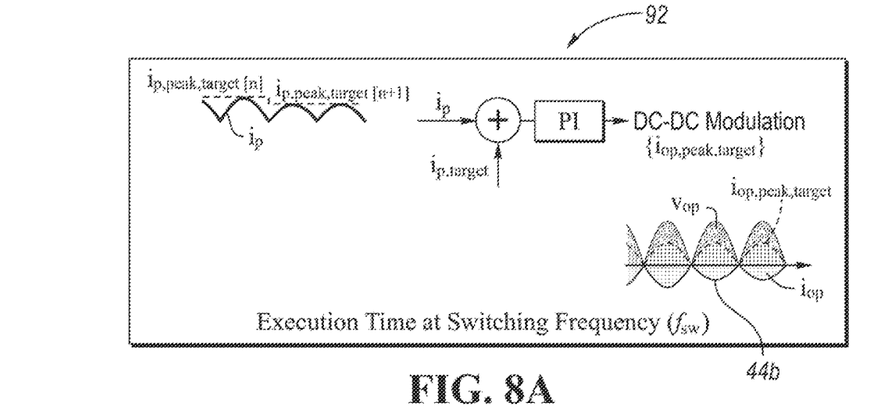
FIG. 8A illustrates details related to how the controller controls the primary-side power switch bridge of the AC/DC converter to generate a desired primary-side output voltage/current ($v_{op}$)/($i_{op}$) and in conjunction controls the secondary-side power switch bridge of the AC/DC converter to generate a desired secondary-side input voltage/current ($v_{os}$)/($i_{os}$) from the desired primary-side output voltage/current ($v_{op}$)/($i_{op}$)
Figure 8B:
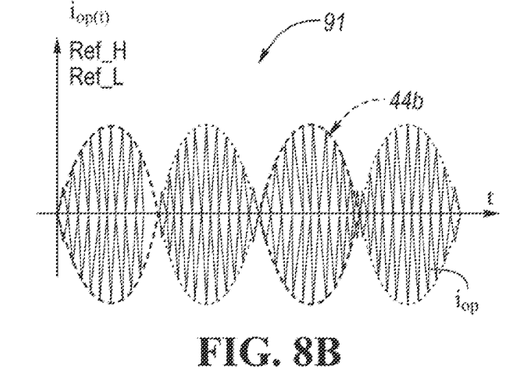
FIG. 8B illustrates an enlarged plot of the primary-side output current ($i_{op}$) generated by the primary-side power switch bridge.
Figure 8C:
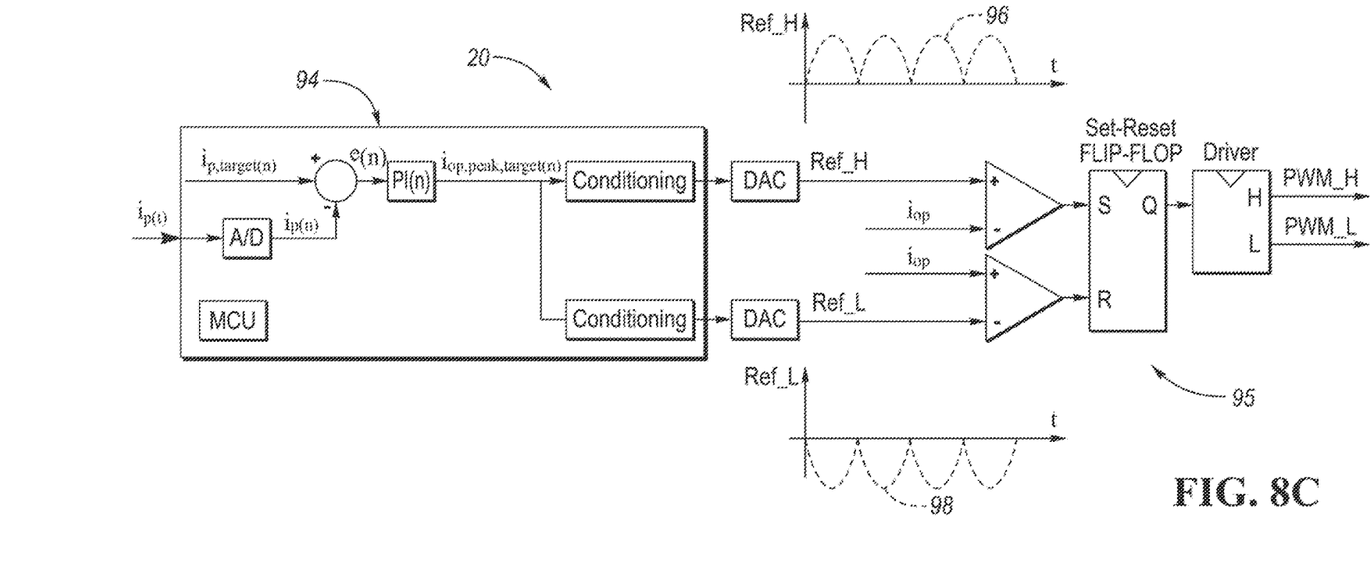
FIG. 8C illustrates a block diagram schematic of the controller which includes a second micro-controller and a second hysteretic comparator assembly which function together to control the primary-side power switch bridge to generate the desired primary-side output voltage/current ($v_{op}$)/($i_{op}$) and in conjunction control the secondary-side power switch bridge to generate the desired secondary-side input voltage/current ($v_{os}$)/($i_{os}$) from the desired primary-side output voltage/current ($v_{op}$)/($i_{op}$)

Referring now to FIGS. 8A, 8B, and 8C, with continual reference to FIG. 6, control strategy operations carried out by controller 20 for controlling primary-side power switch bridge 30 to generate a desired primary-side output voltage/current ($v_{op}$)/($i_{op}$) and in conjunction controlling secondary-side power switch bridge 32 to generate from the desired primary-side output voltage/current ($v_{op}$)/($i_{op}$) a desired secondary-side input voltage/current ($v_{os}$)/($i_{os}$) will be described.

FIG. 8A illustrates details 92 related to these control strategy operations. As depicted therein, modulation ("DC-DC modulation") of power switches of power switch bridges 30, 32 by controller 20 is based on a difference between (i) the rectified output current ($i_p$) drawn by primary-side power switch bridge 30 and (ii) a target, rectified output current ($i_{p,target}$) to be drawn by the primary-side power switch bridge to generate the desired primary-side output current ($i_{op}$). Controller 20 controls power switches of primary-side power switch bridge 30 according to the DC-DC modulation to cause the primary-side power switch bridge to generate the desired primary-side output voltage/current ($v_{op}$)/($i_{op}$)

from the rectified output current ($i_p$) associated with the rectified output voltage ($v_p$). In conjunction, controller 20 controls power switches of secondary-side power switch bridge 32 according to the DC-DC modulation to cause the secondary-side power switch bridge to generate a desired secondary-side input voltage/current ($v_{os}$)/($i_{os}$) from the desired primary-side output voltage/current ($v_{op}$)/($i_{op}$).

Details 92 shown in FIG. 8A relate to how controller 20 is to control primary-side power switch bridge 30 to generate the desired primary-side output current ($i_{op}$). The inputs for this determination are (i) the rectified input current ($i_p$) drawn by primary-side power switch bridge 30 and (ii) the target, rectifier output current ($i_{p,target}$) desired to be drawn by the primary-side power switch bridge to generate the desired primary-side output current ($i_{op}$). The rectified input current ($i_p$) drawn by primary-side power switch bridge 30 is measured using a sensor. Controller 20 generates the target, rectifier output current ($i_{p,target}$), as will be described with reference to FIG. 9 and its description. The output of this determination is a peak, target primary-side output current ($i_{op,PEAK,target}$). The peak, target primary-side output current ($i_{op,PEAK,target}$) defines the DC-DC modulation according to which controller 20 controls the power switches of power switch bridges 30, 32, in which thereby the primary-side output current ($i_{op}$) and the secondary-side output current are equal ($i_{os}$) (i.e., $i_{op}=i_{os}$).

Particularly, as described below with reference to FIGS. 8B and 8C, the peak, target primary-side output current ($i_{op,PEAK,target}$) is indicative of mirrored, sinusoidal peak current waveform 44b of desired primary-side output current ($i_{op}$). As described below with reference to FIG. 8C, the peak, target primary-side output current ($i_{op,PEAK,target}$) is inputted to a high-speed (hardware) conversion stage (i.e., second micro-controller 94 shown in FIG. 8C) of controller 20 for power switch bridges 30, 32 to be controlled accordingly to generate the desired primary-side ($i_{op}$) and secondary-side output currents ($i_{os}$) in which $i_{op}=i_{os}$.

FIG. 8B illustrates an enlarged plot 91 of the primary-side output current ($i_{op}$) generated by primary-side power switch bridge 30. As shown in enlarged plot 84, the primary-side output current ($i_{op}$) is composed of triangular current waveforms which oscillate at a much higher frequency than the frequency of mirrored, sinusoidal peak current waveform 44b. The triangular current waveforms are generated due to controller 20 alternately turning on-and-off respective pairs of power switches of primary-side power switch bridge 30 according to the DC-DC modulation to thereby cause the primary-side power switch bridge to generate the desired primary-side output voltage/current ($v_{op}$)/($i_{op}$) from the rectified output current ($i_p$) associated with the rectified output voltage ($v_p$).

Controller 20, concurrently with alternately turning on-and-off pairs of power switches of primary-side power switch bridge 30, alternately turns on-and-off corresponding pairs of power switches of secondary-side power switch bridge 32 for the secondary-side power switch bridge to generate the desired secondary-side input voltage/current ($v_{os}$)/($i_{os}$) from the desired primary-side output voltage/current ($v_{op}$)/($i_{op}$). For instance, controller 20 turns on one pair of primary-side power switches (e.g., turns on power switches ($M_{p,H1}$) and ($M_{p,L2}$)) and concurrently turns on its corresponding pair of secondary-side power switches (i.e., turns on power switches ($M_{s,L1}$) and ($M_{s,H2}$)) while turning off the other pair of primary-side power switches (e.g., turns off power switches ($M_{p,L1}$) and ($M_{p,H2}$)) and concurrently turning off its corresponding pair of secondary-side power switches (i.e., turns off power switches ($M_{s,H1}$) and ($M_{s,L2}$)). This is such as AC/DC converter 26 has the dual active bridge (DAB) topology. In this way, secondary-side power switch bridge 32 generates secondary-side voltage/current ($v_{os}$)/($i_{os}$) from the primary-side output voltage/current ($v_{op}$)/($i_{op}$).

FIG. 8C illustrates a block diagram schematic of a second micro-controller 94 and a second hysteretic comparator assembly 95 of controller 20. Second micro-controller 94 and second comparator assembly 95 function together to control the operation of primary-side power switch bridge 30 to generate the desired primary-side output voltage/current ($v_{op}$)/($i_{op}$) and in conjunction the operation of secondary-side power switch bridge 32 to generate the desired secondary-side input voltage/current ($v_{os}$)/($i_{os}$) from the desired primary-side output voltage/current ($v_{op}$)/($i_{op}$).

In operation, second micro-controller 94 generates a third reference signal ("Ref_H") 96 and a fourth reference signal ("Ref_L") 98. As can be seen from a comparison of FIGS. 8B and 8C, third reference signal 96 corresponds to the positive cycles of mirrored, sinusoidal peak current waveform 44b and fourth reference signal 98 corresponds to negative cycles of mirrored, sinusoidal peak current waveform 44b. As indicated in FIG. 8C, second micro-controller 94 generates each of third and fourth reference signals 96, 98 based on respective down-stream conditioning of the peak, target primary-side output current ($i_{op,PEAK,target}$).

Second comparator assembly 95 functions to generate control (i.e., trigger) signals for alternately switching on-and-off respective pairs of power switches of primary-side and secondary-side power switch bridges 30, 32. Second comparator assembly 95 generates the control signals based on a comparison of the primary-side output current ($i_{op}$) with each of third and fourth reference signals 96 and 98. For instance, with reference to FIGS. 8B and 8C, upon the value of the primary-side output current ($i_{op}$) equaling the value of third reference signal 96 (i.e., upon the primary-side output current ($i_{op}$) intersecting the positive cycles of mirrored, sinusoidal peak current waveform 44b), second comparator assembly 95 generates control signals to turn off one pair of primary-side power switches (e.g., turn off power switches ($M_{p,H1}$) and ($M_{p,L2}$)) and to turn on the other pair of primary-side power switches (e.g., turn on power switches ($M_{p,L1}$) and ($M_{p,H2}$)). Likewise, with further reference to FIGS. 8B and 8C, upon the value of the primary-side output current ($i_{op}$) equaling the value of fourth reference signal 98 (i.e., upon the primary-side current ($i_{op}$) intersecting the negative cycles of mirrored, sinusoidal peak current waveform 44b), second comparator assembly 95 generates control signals to turn on the one pair of primary-side power switches (i.e., turn on power switches ($M_{p,H1}$) and ($M_{p,L2}$)) and to turn off the other pair of primary-side power switches (i.e., turn off power switches ($M_{p,L1}$) and ($M_{p,H2}$)).

Just like first comparator assembly 78, second comparator assembly 95 includes the same type of layout of first and second analog comparator circuits, a digital flip-flop circuit, and a digital driver circuit as shown in FIG. 8C. The operation of second micro-controller 94 and second comparator assembly 95 is analogous to above-described operation of first micro-controller 76 and first comparator assembly 78.

First micro-controller 76 and second micro-controller 94 may be embodied as separate micro-controllers as described or as a single micro-controller. First micro-controller 76 and second micro-controller 94 may be a part of controller 20 as described or may be a part of other controller(s).

Figure 9:
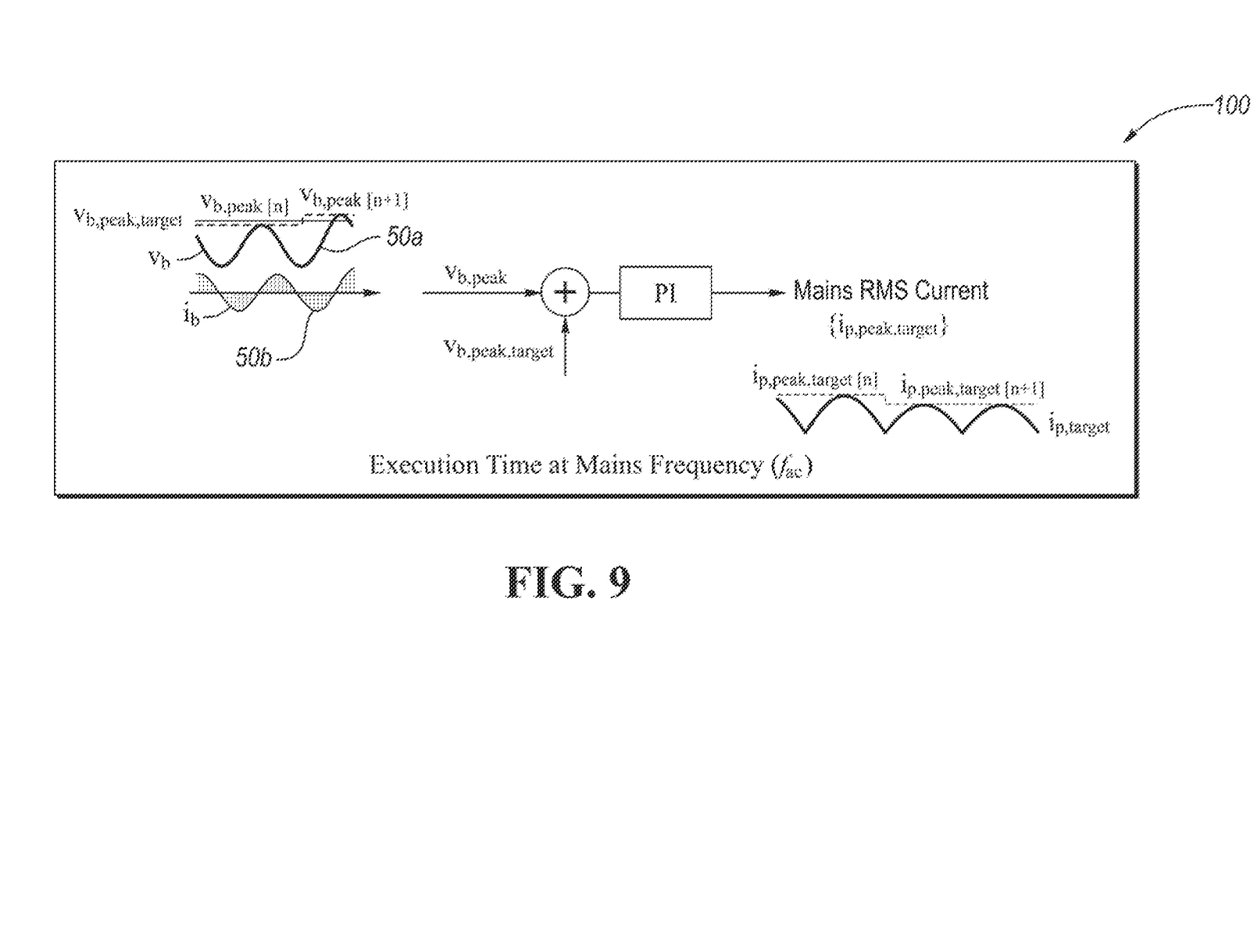
FIG. 9 illustrates details related to how the controller generates a target, rectifier output current ($i_{p,target}$) for use in controlling the primary-side power switch bridge to generate the desired primary-side output voltage/current ($v_{op}$)/($i_{op}$) and in conjunction controlling the secondary-side power switch bridge to generate the desired secondary-side input voltage/current ($v_{os}$)/($i_{os}$) from the desired primary-side output voltage/current ($v_{op}$)/($i_{op}$).

Referring now to FIG. 9, with continual reference to FIGS. 6 and 8C, details 100 related to how controller 20 generates the target, rectifier output current ($i_{p,target}$) are shown. The inputs for this determination are (i) the buffer voltage ($v_b$) of PB converter 26 and (ii) a peak, target buffer voltage ($v_{b,PEAK,target}$) of PB converter 26. The buffer voltage ($v_b$) of PB converter 26 is measured internally by a micro-controller of controller 20, such as periodically every 10 mSec (100 Hz). The output of this determination is a peak, target rectifier output current ($i_{b,PEAK,target}$). The peak, target rectifier output current ($i_{b,PEAK,target}$) is used by controller 20 as an input to generate the target, rectifier output current ($i_{p,target}$). Particularly, the target, rectifier output current ($i_{p,target}$) is generated according to ($i_{p,target}$) =PI_Function($v_{b,pEAK,target}$, $v_b$). Further, the target, rectifier output current ($i_{p,target}$) is saturated (limited) according to $i_{batt,target}$ consign from the system which determines the maximum input current according to charging power demand ($i_{batt,target}$, $v_{batt,sense}$). Again, this is a low speed calculation done in a micro-controller of controller 20.

In summary, for each phase of OBC 12:

from vehicle system: $v_{batt,target}$, $i_{batt,target}$;
$i_{batt,target}$=0 if $v_{batt\_sense}$>$v_{batt\_target}$;
$i_{b,peak,target}$=PI_Function($i_{batt,target}$, $i_{batt}$);
$v_{b,peak,target}$ is a constant value determined by design (maximum voltage that capacitor $C_b$ of PB buffer 26 can withstand);
$v_{batt}$ (=$v_s$) and $v_b$ are measured;
$v_p$ is rectified $v_{ac}$ (standard process);
with $M_H$ in ON state: $i_s$=$i_{batt}$+$i_b$; and
as $i_{op}$=$i_{os}$, $M_{p,H1}$, $M_{pH2}$, $M_{pL1}$, $M_{pL2}$, $M_{sH1}$, $M_{sH2}$, $M_{sL1}$, and $M_{sL2}$ are controlled with the same high-speed signal (considering switching alternances and dead times to avoid "H" and "L" ON at the same time).

For a 3-phase interleaved OBC 12, the battery current is split in the three phases:

$i_{batt}$=$i_{batt\_1}$+$i_{batt\_2}$+$i_{batt\_3}$ (3-phase interleaved OBC); and
$i_{batt\_n}$=pi/(2*sqrt(2))*($i_{rms\_n}$*$v_{ac\_rms\_n}$)/$v_{batt}$) n=1 . . . 3 (active phase).

While exemplary embodiments are described above, it is not intended that these embodiments describe all possible forms of the present invention. Rather, the words used in the specification are words of description rather than limitation, and it is understood that various changes may be made without departing from the spirit and scope of the invention. Additionally, the features of various implementing embodiments may be combined to form further embodiments of the present invention.

What is claimed is:

1. An on-board charger for charging a battery, comprising:
an electronics assembly including an AC/DC converter and a PB converter connected to the AC/DC converter;
a controller configured to control the AC/DC converter to convert an AC input from a mains supply into an output having a DC voltage and a current ripple and to control the PB converter to process the output of the AC/DC converter to reduce or minimize the current ripple thereof and transform the output of the AC/DC converter into a battery-level DC output for charging the battery;
wherein the AC/DC converter includes a rectifier configured to rectify the AC input from the mains supply into a rectified AC input, and the AC/DC converter further includes a dual-active power switch bridge assembly having a primary-side power switch bridge on a primary-side of a transformer and a secondary-side power switch bridge on a secondary-side of the transformer, the primary-side power switch bridge having two pairs of primary-side power switches and the secondary-side power switch bridge having two pairs of secondary-side power switches;
the controller is further configured to alternately turn on-and-off the power switches of the primary-side and secondary-side power switch bridges in accordance with an AC/DC converter control strategy to cause the AC/DC converter to convert the rectified AC input into the output of the AC/DC converter;
the controller includes a micro-controller and a comparator assembly, the micro-controller is configured to generate a positive reference signal and a negative reference signal based on a difference between the rectified AC input and a desired rectified AC input, the comparator assembly is configured to compare an output current generated by the primary-side power switch bridge from the rectified AC input with the positive reference signal, turn-on a first pair of the primary-side power switches and a first pair of the secondary-side power switches and turn-off a second pair of the primary-side power switches and a second pair of the secondary-side power switches upon the output current equaling the positive reference signal, and turn-off the first pair of the primary-side power switches and the first pair of the secondary-side power switches and turn-on the second pair of the primary-side power switches and the second pair of the secondary-side power switches upon the output current equaling the negative reference signal to thereby cause the AC/DC converter to generate the output of the AC/DC converter.

2. The on-board charger of claim 1 wherein:
the PB converter includes an energy storage capacitor and an inductor and a pair of power switches.

3. The on-board charger of claim 1 wherein:
the AC/DC converter lacks a power factor corrector.

4. The on-board charger of claim 1 wherein:
the AC/DC converter and the PB converter lack a DC link capacitor therebetween.

5. The on-board charger of claim 1 wherein:
the PB converter includes an energy storage capacitor and an inductor and a pair of power switches; and
wherein the controller is further configured to alternately turn on-and-off the power switches of the PB converter in accordance with a PB converter control strategy to cause the PB converter to process the output of the AC/DC converter to reduce or minimize the current ripple thereof and transform the output of the AC/DC converter into the battery-level DC output for charging the battery.

6. The on-board charger of claim 1 wherein:
the comparator assembly includes a first comparator which receives the positive reference signal and a sensed value of the output current and switches its output upon the output current equaling the positive reference signal; and
the comparator assembly further includes a second comparator which receives the negative reference signal and the sensed value of the output current and switches its output upon the output current equaling the negative reference signal.

7. The on-board charger of claim 6 wherein:
the comparator assembly further includes a digital two-state change circuit and a digital driver circuit which function with the outputs of the first and second comparators to maintain on the first pair of the primary-side power switches and the first pair of the secondary-side power switches and maintain off the second pair of the primary-side power switches and the second pair of the secondary-side power switches until the output current equals the negative reference signal and to maintain off the first pair of the primary-side power switches and the first pair of the secondary-side power switches and maintain on the second pair of the primary-side power switches and the second pair of the secondary-side power switches until the output current equals the positive reference signal to thereby cause the AC/DC converter to generate the output of the AC/DC converter.

8. The on-board charger of claim 1 wherein:
the AC/DC converter lacks a power factor corrector; and
the AC/DC converter and the PB converter lack a DC link capacitor therebetween.

9. The on-board charger of claim 1 further comprising:
an additional AC/DC converter connected to the PB converter; and
the controller is further configured to control the additional AC/DC converter to convert the AC input from the mains supply into an additional output having a DC voltage and a current ripple and to control the PB converter to process the additional output of each additional AC/DC converter to reduce or minimize the current ripple thereof and transform the additional output of each additional AC/DC converter into the battery-level DC output for charging the battery.

10. An on-board charger for charging a battery, comprising:
an electronics assembly including an AC/DC converter and a PB converter connected to the AC/DC converter;
a controller configured to control the AC/DC converter to convert an AC input from a mains supply into an output having a DC voltage and a current ripple and to control the PB converter to process the output of the AC/DC converter to reduce or minimize the current ripple thereof and transform the output of the AC/DC converter into a battery-level DC output for charging the battery;
wherein the PB converter includes an energy storage capacitor and an inductor and a pair of power switches;
the controller is further configured to alternately turn on-and-off the power switches of the PB converter in accordance with a PB converter control strategy to cause the PB converter to process the output of the AC/DC converter to reduce or minimize the current ripple thereof and transform the output of the AC/DC converter into the battery-level DC output for charging the battery; and
the controller includes a micro-controller and a comparator assembly, the micro-controller is configured to generate a positive reference signal and a negative reference signal based on a difference between (i) an output current of the PB converter and (ii) a target output current, the comparator assembly is configured to compare a buffer current absorbed by the PB converter from the DC output with the ripple with the positive reference signal, turn-on a first one the power switches of the PB converter and turn-off a second one of the power switches of the PB converter upon the PB converter buffer current equaling the positive reference signal, and turn-off the first one of the power switches of the PB converter and turn-on the second one of the power switches of the PB converter upon the PB converter buffer current equaling the negative reference signal to thereby cause the PB converter to process the output of the AC/DC converter to reduce or minimize the current ripple thereof and transform the output of the AC/DC converter into the battery-level DC output for charging the battery.

11. The on-board charger of claim 10 wherein:
the comparator assembly includes a first comparator which receives the positive reference signal and a sensed value of the PB converter buffer current and switches its output upon the PB converter buffer current equaling the positive reference signal; and
the comparator assembly further includes a second comparator which receives the negative reference signal and the sensed value of the PB converter buffer current and switches its output upon the PB converter buffer current equaling the negative reference signal.

12. The on-board charger of claim 11 wherein:
the comparator assembly further includes a digital two-state change circuit and a digital driver circuit which function with the outputs of the first and second comparators to maintain on the first power switch of the PB converter and maintain off the second power switch of the PB converter until the PB converter buffer current equals the negative reference signal and to maintain off the first power switch of the PB converter and maintain on the second power switch of the PB converter until the PB converter buffer current equals the positive reference signal to thereby cause the PB converter to process the output of the AC/DC converter to reduce or minimize the current ripple thereof and transform the output of the AC/DC converter into the battery-level DC output for charging the battery.

* * * * *